United States Patent
Bhanage et al.

(10) Patent No.: US 9,408,181 B2
(45) Date of Patent: Aug. 2, 2016

(54) AUTOMATIC CALIBRATION OF PROBE REQUEST RECEIVED SIGNAL STRENGTH INDICATION (RSSI) THRESHOLD TO CONTROL ASSOCIATIONS

(71) Applicant: Aruba Networks, Inc., Sunnyvale, CA (US)

(72) Inventors: Gautam D. Bhanage, Sunnyvale, CA (US); Parthasarathy Narasimhan, Saratoga, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 108 days.

(21) Appl. No.: 14/258,998

(22) Filed: Apr. 22, 2014

(65) Prior Publication Data

US 2015/0304978 A1 Oct. 22, 2015

(51) Int. Cl.
| | |
|---|---|
| H04W 64/00 | (2009.01) |
| H04W 28/02 | (2009.01) |
| H04W 24/02 | (2009.01) |
| H04W 40/24 | (2009.01) |
| H04W 24/08 | (2009.01) |
| H04W 48/20 | (2009.01) |

(52) U.S. Cl.
CPC .......... *H04W 64/006* (2013.01); *H04W 24/02* (2013.01); *H04W 28/0236* (2013.01); *H04W 40/244* (2013.01); *H04W 24/08* (2013.01); *H04W 48/20* (2013.01)

(58) Field of Classification Search
None
See application file for complete search history.

(56) References Cited

U.S. PATENT DOCUMENTS

| | | | |
|---|---|---|---|
| 8,655,355 B2 | 2/2014 | Lagnado et al. | |
| 2005/0259619 A1 | 11/2005 | Boettle et al. | |
| 2009/0323531 A1* | 12/2009 | Matta | H04L 47/10 370/235 |
| 2010/0054179 A1* | 3/2010 | Meyer | H04W 48/20 370/328 |
| 2011/0030037 A1* | 2/2011 | Olshansky | H04L 12/4641 726/4 |
| 2013/0077505 A1* | 3/2013 | Choudhary | H04W 48/14 370/252 |
| 2014/0323087 A1* | 10/2014 | Huang | H04W 48/16 455/411 |
| 2015/0257117 A1* | 9/2015 | Diener | H04W 48/14 370/328 |

OTHER PUBLICATIONS

Aruba Networks, "ARM Overview," Dec. 23, 2013, Adaptive Radio Management, <http://www.arubanetworks.com/techdocs/Instant_40_Mobile/Advanced/Content/UG_files/ARM/ARM_Features.htm>.
Aruba Networks, "Configuring ARM Features on an IAP," Apr. 23, 2013, <http://www.arubanetworks.com/techdocs/InstantHTML/Content/Chapter15%20Adaptive%20Radio%20Management/Configuring_ARM-Features.htm>.
ITNOTES.IN, "Signal to Noise Ration," Jul. 26, 2013, <http://itnotes.in/signal-noise-ration/>.

(Continued)

*Primary Examiner* — Gary Mui
(74) *Attorney, Agent, or Firm* — Hewlett Packard Enterprise Patent Department

(57) ABSTRACT

System and methods are provided for dynamically setting a threshold signal-to-noise ratio for probe requests for one or more access points in a wireless network based on several factors, including density/distance between access points and/or current and expected load on access points. By dynamically adjusting a threshold signal-to-noise for probe requests, the systems and methods described herein may efficiently utilize resources based on current and/or expected conditions. In particular, an access point may ignore client device probe requests when another access point may be better positioned to handle such a request and/or when the access point would be unable to meet expected load requirements if such an associate were made.

20 Claims, 5 Drawing Sheets

(56) References Cited

OTHER PUBLICATIONS

Jim Geier, "How to: Define Minimum SNR Values for Signal Coverage," Jul. 2, 2008, <http://web.archive.org/web/20080702143531/http://www.wireless-nets.com/resources/tutorials/define_SNR_values.html>.

Wikipedia, "Throughput," Mar. 1, 2014, <https://en.wikipedia.org/w/index.php?title=Throughput&oldid=597710602>.

* cited by examiner

AUTOMATIC CALIBRATION OF PROBE REQUEST RECEIVED SIGNAL STRENGTH INDICATION (RSSI) THRESHOLD TO CONTROL ASSOCIATIONS

TECHNICAL FIELD

The present disclosure relates to dynamically setting a threshold signal-to-noise for probe requests for one or more access points in a wireless network based on several factors, including density/distance between access points and/or load on access points.

BACKGROUND

Over the last decade, there has been a substantial increase in the use and deployment of wireless client devices, from dual-mode smartphones to tablets capable of operating in accordance with a particular Institute of Electrical and Electronics Engineers (IEEE) standard. With "wireless" becoming the de-facto medium for connectivity among users, it has become increasingly important for network systems to intelligently manage connections.

In some environments, client devices may attempt to associate with an access point by transmitting a probe request. Traditionally, a threshold signal-to-noise ratio is manually preset for the access point and/or the wireless network. Probe requests that fall below this manually preset threshold signal-to-noise ratio are ignored by the corresponding access point. Although this threshold signal-to-noise ratio allows the access points and wireless network to ignore probe requests from client devices, this manually set threshold does not take into account dynamic environmental variables.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
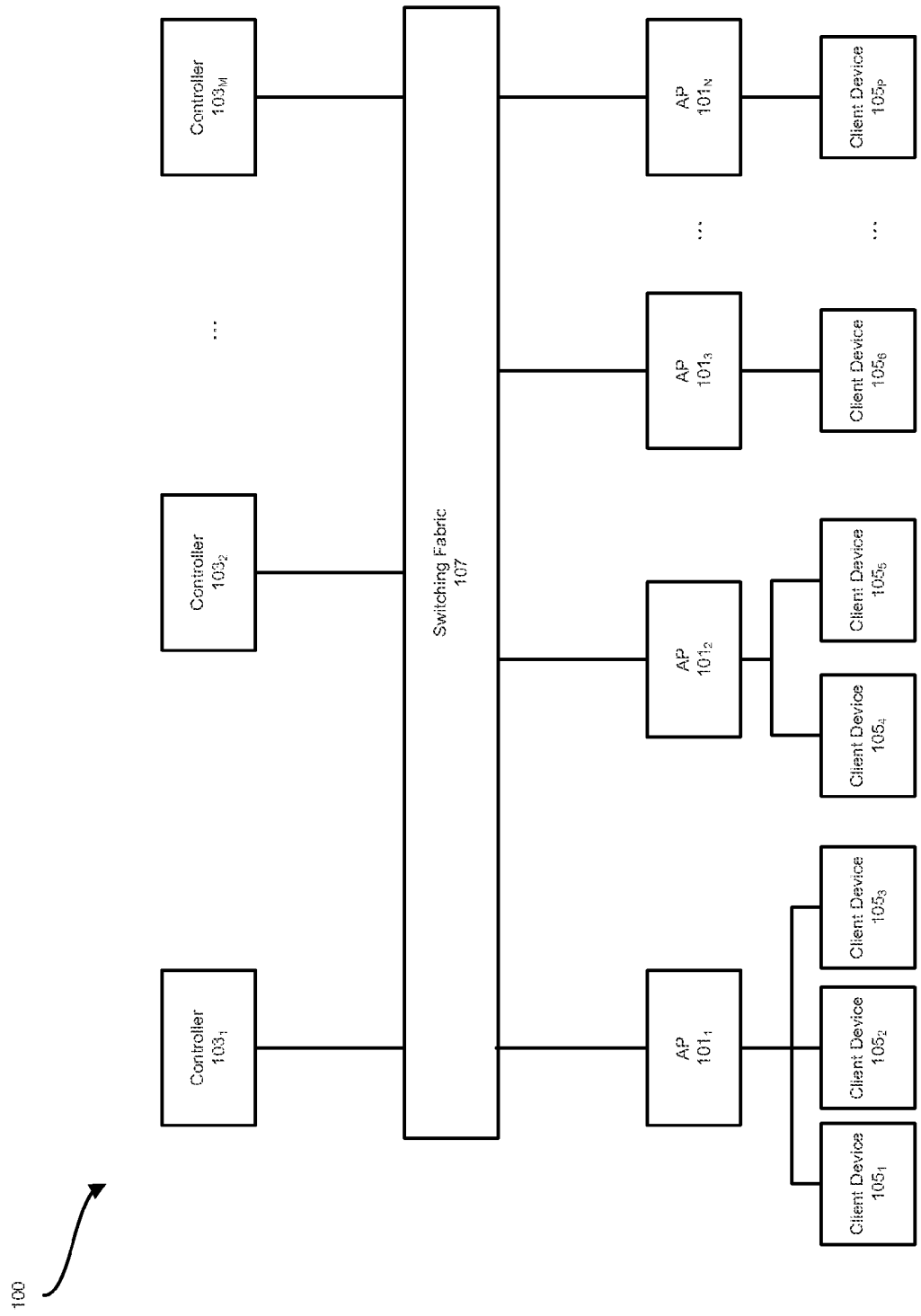
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

FIG. 1 shows a block diagram example of a network system 100 in accordance with one or more embodiments. The network system 100, as illustrated in FIG. 1, is a digital system that may include a plurality of digital devices such as one or more access points $101_1$-$101_N$, one or more network controllers $103_1$-$103_M$, and one or more client devices $105_1$-$105_P$. The client devices $105_1$-$105_P$ may be connected or otherwise associated with the access points $101_1$-$101_N$ through corresponding wireless connections. As will be described in greater detail below, the client devices $105_1$-$105_P$ may establish connections with access points $101_1$-$101_N$ through the use of probe requests. In particular, a client device $105_1$-$105_P$, may transmit a probe request to one or more of the access points $101_1$-$101_N$. An access point $101_1$-$101_N$ may respond to a probe request such that a connection may be established between the client device $105_1$-$105_P$ and the corresponding access point $101_1$-$101_N$. However, an access point $101_1$-$101_N$ may ignore a request if the request fails to meet one or more requirements. For example, a probe request may be ignored if the request fails to meet a threshold signal-to-noise ratio of a corresponding access point $101_1$-$101_N$. Processes and techniques for setting these threshold signal-to-noise ratios for access points $101_1$-$101_N$ will be described in greater detail below.

The access points $101_1$-$101_N$ and the network controllers $103_1$-$103_M$ may be connected through the switching fabric 107 through wired and/or wireless connections. Each element of the network system 100 will be described below by way of example. In one or more embodiments, the network system 100 may include more or less devices than the devices illustrated in FIG. 1, which may be connected to other devices within the network system 100 via wired and/or wireless mediums. For example, in other embodiments, the network system 100 may include additional access points 101, network controllers 103, and/or client devices 105 than those shown in FIG. 1.

Figure 2:
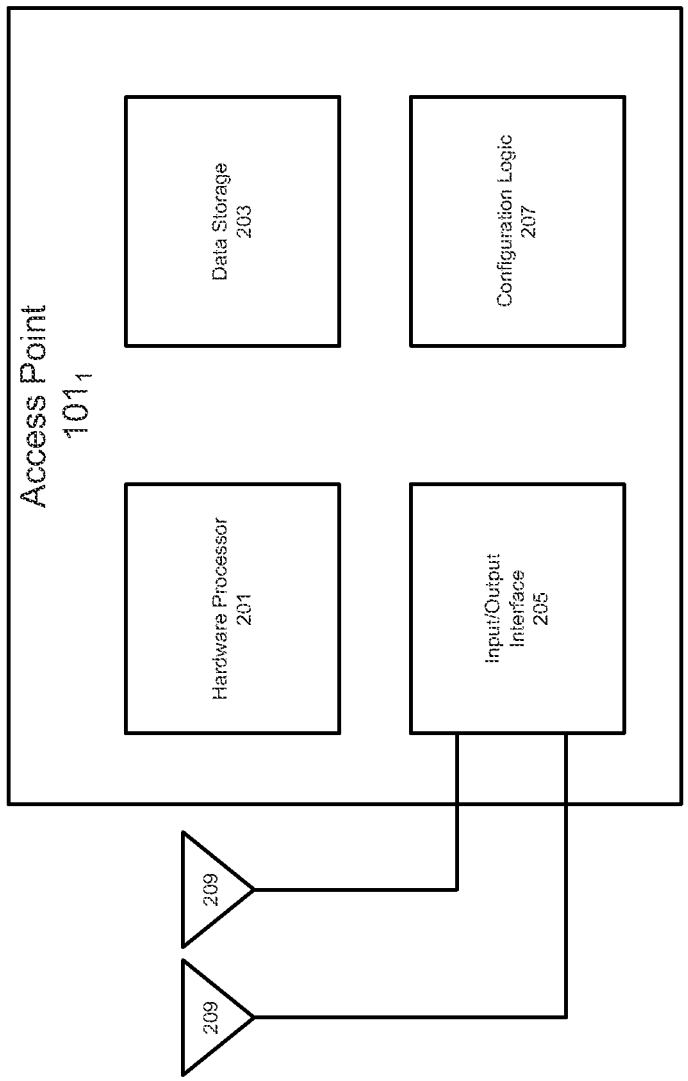
FIG. 2 shows a block diagram example of an access point in accordance with one or more embodiments.

The access points $101_1$-$101_N$ may be any device that can associate with the client devices $105_1$-$105_P$ to transmit and receive data over wireless channels. Each of the access points $101_1$-$101_N$ may be configured to operate one or more virtual access points (VAPs) that allow each of the access points $101_1$-$101_N$ to be segmented into multiple broadcast domains. In one embodiment, the access points $101_1$-$101_N$ may correspond to a network device such as a wireless access point, a switch, a router, or any combination thereof. FIG. 2 shows a component diagram of the access point $101_1$ according to one embodiment. In other embodiments, the access points $101_2$-$101_N$ may include similar or identical components to those shown and described in relation to the access point $101_1$.

As shown in FIG. 2, the access point $101_1$ may comprise one or more of: a hardware processor 201, data storage 203, an input/output (I/O) interface 205, and device configuration logic 207. Each of these components of the access point $101_1$ will be described in further detail below.

The data storage 203 of the access point $101_1$ may include a fast read-write memory for storing programs and data during performance of operations/tasks and a hierarchy of persistent memory, such as Read Only Memory (ROM), Erasable Programmable Read Only Memory (EPROM) and/or Flash memory for example, for storing instructions and data needed for the startup and/or operation of the access point $101_1$. In one embodiment, the data storage 203 is a distributed set of data storage components. The data storage 203 may store data that is to be transmitted from the access point $101_1$ or data that is received by the access point $101_1$. For example, the data storage 203 of the access point $101_1$ may store data to be forwarded to the client devices $105_1$-$105_3$ or to one or more of the network controllers $103_1$-$103_M$.

In one embodiment, the I/O interface 205 corresponds to one or more components used for communicating with other devices (e.g., the client devices $105_1$-$105_P$, the network controllers $103_1$-$103_M$, and/or other access points $101_2$-$101_N$) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client devices $105_1$-$105_P$ and the network controllers $103_1$-$103_M$ over corresponding wireless channels in the system 100. In one embodiment, the I/O interface 205 facilitates communications between the access point $101_1$ and one or more of the network controllers $103_1$-$103_M$ through the switching fabric 107. In one embodiment, the switching fabric 107 includes a set of network components that facilitate communications between multiple devices. For example, the switching fabric 107 may be composed of one or more switches, routers, hubs, etc. These network components that comprise the switching fabric 107 may operate using both wired and wireless mediums.

In some embodiments, the I/O interface 205 may include one or more antennas 209 for communicating with the client devices $105_1$-$105_P$, the network controllers $103_1$-$103_M$, and/or other wireless devices in the network system 100. For example, multiple antennas 209 may be used for forming transmission beams to one or more of the client devices $105_1$-$105_P$ or the network controllers $103_1$-$103_M$ through adjustment of gain and phase values for corresponding antenna 209 transmissions. The generated beams may avoid objects and create an unobstructed path to the client devices $105_1$-$105_P$ and/or the network controllers $103_1$-$103_M$.

In one embodiment, the hardware processor 201 is coupled to the data storage 203 and the I/O interface 205. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof for configuring parameters associated with the access point $101_1$. In one embodiment, the device configuration logic 207 may be configured to allow the access point $101_1$ to associate with different client devices $105_1$-$105_P$.

As described above, the other access points $101_2$-$101_N$ may be similarly configured as described above in relation to access point $101_1$. For example, the access points $101_2$-$101_N$ may each comprise a hardware processor 201, data storage 203, an input/output (I/O) interface 205, and device configuration logic 207 in a similar fashion as described above in relation to the access point $101_1$.

In one embodiment, the client devices $105_1$-$105_P$ may be any wireless or wired electronic devices capable of receiving and transmitting data over wired and wireless mediums. For example, the client devices $105_1$-$105_P$ may be one or more of personal computers, laptop computers, netbook computers, wireless music players, portable telephone communication devices, smart phones, tablets, and digital televisions. In one embodiment, the client devices $105_1$-$105_P$ are digital devices that include a hardware processor, memory hierarchy, and input/output (I/O) interfaces including a wired and/or wireless interface such as an IEEE 802.3 interface. In one embodiment, the configuration of the components within the client devices $105_1$-$105_P$ may be similar to those discussed above in relation to the access point $101_1$. In other embodiments, the client devices $105_1$-$105_P$ may include more or less components than those shown in FIG. 2 in relation to the access point $101_1$.

As noted above, the client devices $105_1$-$105_P$ may attempt to associate with an access point $101_1$-$101_N$ through the transmission of a probe request. As will be described in greater detail below, the corresponding access point $101_1$-$101_N$ may analyze the probe requests received from the client device $105_1$-$105_P$ to determine whether the client device $105_1$-$105_P$ will be allowed to associate with the access point $101_1$-$101_N$. In some embodiments, the access point $101_1$-$101_N$ may indicate that a client device $105_1$-$105_P$ is not allowed to associate with the access point $101_1$-$101_N$ through the transmission of a response to a corresponding probe request. While in other embodiments, the access point $101_1$-$101_N$ may indicate that a client device $105_1$-$105_P$ is not allowed to associate with the access point $101_1$-$101_N$ through failing to respond or otherwise ignoring a corresponding probe request. For example, a probe request may be ignored if the request fails to meet a threshold signal-to-noise ratio of a corresponding access point $101_1$-$101_N$. Processes and techniques for setting these threshold signal-to-noise ratios for access points $101_1$-$101_N$ will be described in greater detail below.

In one embodiment, the network controllers $103_1$-$103_M$ are digital devices that include a hardware processor, memory hierarchy, and input/output (I/O) interfaces including a wired and/or wireless interface such as an IEEE 802.3 interface. In one embodiment, the configuration of the components within the network controllers $103_1$-$103_M$ may be similar to those discussed above in relation to the access point $101_1$. In other embodiments, the network controllers $103_1$-$103_M$ may include more or less components than those shown in FIG. 2 in relation to the access point $101_1$.

In one embodiment, the network controllers $103_1$-$103_M$ may be any set of devices that assist the access points $101_1$-$101_N$ in performing network tasks and operations. For example, the network controllers $103_1$-$103_M$ may assist in determining a threshold signal-to-noise ratio to be used by the access points $101_1$-$101_N$ for processing a probe request received from a client device $105_1$-$105_P$. The threshold signal-to-noise ratio is the ratio of signal-to-noise in a probe request signal/frame received from a client device $105_1$-$105_P$ at which the access point $101_1$-$101_N$ may respond and attempt to associate with the client device $105_1$-$105_P$. For example, if the threshold signal-to-noise ratio for the access point $101_1$ is 10 dB and a probe request from the client device $105_1$ has a signal-to-noise ratio of 9 dB, the access point $101_1$ will not respond to the probe request and will not attempt to associate with the client device $101_1$. In contrast, if the threshold signal-to-noise ratio for the access point $101_1$ is 10 dB and a probe request from the client device $105_1$ has a signal-to-noise ratio of 11 dB, the access point $101_1$ will respond to the probe request and will attempt to associate with the client device $101_1$.

The threshold signal-to-noise ratio may be set based on various factors, including the density of or distance between access points $101_1$-$101_N$ and/or current and/or expected access point $101_1$-$101_N$ load. In contrast to traditional systems, dynamic setting of the threshold signal-to-noise ratio for each of the access points $101_1$-$101_N$ allows the network system 100 to more efficiently associate client devices $105_1$-$105_P$ with access points $101_1$-$101_N$ with a reduced number of client device $105_1$-$105_P$ moves. The different processes and techniques for dynamically setting/selecting threshold signal-to-noise ratios will be discussed in greater detail below.

Figure 3:
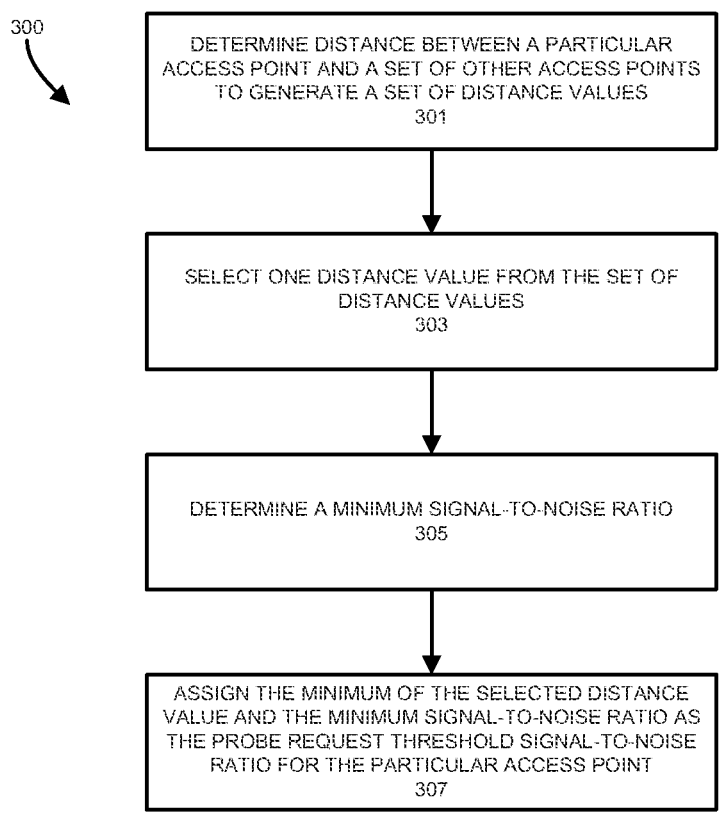
FIG. 3 shows a method for dynamically determining a threshold signal-to-noise ratio for an access point based on distance/density between access points according to one embodiment.

FIG. 3 shows a method 300 for dynamically determining a threshold signal-to-noise ratio for an access point $101_1$-$101_N$ according to one embodiment. The method 300 may be performed by one or more devices in the network system 100. For example, the method 300 may be performed by one or more of the network controllers $103_1$-$103_M$ in conjunction with one or more of the access points $101_1$-$101_N$ in the network system 100. In one embodiment, one of the network controllers $103_1$-$103_M$ may be designated as a master network controller in the network system 100 such that each operation of the method 300 is performed by this designated master network controller. In another embodiment, the method 300 may be entirely performed by a single access point $101_1$-$101_N$. Accordingly, each access point $101_1$-$101_N$ may autonomously decide a threshold signal-to-noise ratio for responding to client device $105_1$-$105_P$ probe requests.

Although each of the operations in the method 300 are shown and described in a particular order, in other embodiments, the operations of the method 300 may be performed in a different order. For example, although the operations of the method 300 are shown as being performed sequentially, in other embodiments the operations of the method 300 may be performed in overlapping or at least partially overlapping time periods.

In one embodiment, the method 300 may commence at operation 301 with the determination of the distances between a particular access point 101 and a selected set of other access points 101. For example, the particular access point 101 may be the access point $101_1$ and the selected set of access points 101 may be the access points $101_2$ and $101_3$. In one embodiment, the set of access points $101_2$ and $101_3$ may be selected based on a shared channel and/or a shared Service Set Identifier (SSID) with the particular access point $101_1$. Accordingly, the access points $101_1$-$101_3$ may each operate on the same channel and/or on the same SSID. Although described hereinafter in relation to the access points $101_1$-$101_3$, the method 300 may be similarly performed for other sets of access points $101_1$-$101_N$. Accordingly, each access point $101_1$-$101_N$ may separately determine a threshold signal-to-noise ratio that is used for determining whether probe requests from client devices $105_1$-$105_P$ are ignored or responded to.

Operation 301 may determine the distances between the particular access point $101_1$ and each of the access points $101_2$ and $101_3$ using any technique or process. In one embodiment, the distances between the access point $101_1$ and each of the access points $101_2$ and $101_3$ may be determined at operation 301 based on a set of probe signals. For example, a set of probe signals may be transferred between the access point $101_1$ and each of the access points $101_2$ and $101_3$. Upon receipt, the signal strength of the received signals may be compared against the original transmission strength to determine a difference value. For example, the original transmission strength of a test probe signal between the access point $101_1$ and the access point $101_2$ may be 20 dB while the received signal strength may be 16 dB. Accordingly, the distance between the access point $101_1$ and $101_2$ may be described as 4 dB (i.e., 20 dB-16 dB).

In another embodiment, the relative positions of each of the access points $101_1$-$101_N$ may be recorded during setup of the network system 100. In this embodiment, operation 301 may determine the distance between the access point $101_1$ and each of the access points $101_2$ and $101_3$ by looking up the locations in a stored table and/or database. These pre-recorded distances may be represented in decibels.

In other embodiments, the distances between access points $101_1$-$101_N$ may be determined using any other technique. These distance values may be used to represent a density of access points $101_1$-$101_N$ in a particular area.

Following determination of a set of distance values at operation 301, operation 303 may select one distance value from the set of distance values. For example, operation 303 may select the minimum distance value, the maximum distance value, the mode of the distances values, the average of the distance values, etc. For instance, in one embodiment, the maximum distance value from the set of distances determined at operation 301 may be selected at operation 303. This maximum distance value may reflect the density of access points $101_1$-$101_3$ in the network system 100 and/or the farthest radio frequency distance between the access point $101_1$ and a client device $105_1$-$105_P$ in the network system 100. A client device $105_1$-$105_P$ should not associate with the access point $101_1$ that is farther than the access points $101_2$ and $101_3$ as instead these client devices $105_1$-$105_P$ should attempt to associate with the closer access points $101_2$ and $101_3$. In these embodiments, the method 300 is performed with the assumption that the access points $101_1$-$101_3$ are uniformly distributed within the network system 100. Accordingly, each of the access points $101_1$ may be uniformly spaced from 1) other access points $101_2$ and $101_3$ and 2) the boundaries of the area covered/serviced by the network system 100.

Following selection of a distance value at operation 303, operation 305 may determine a minimum signal-to-noise ratio. The minimum signal-to-noise ratio reflects a default value for assigning a threshold signal-to-noise ratio for the particular access point $101_1$. For example, the minimum signal-to-noise ratio may be preset by an administrator of the network system 100. In one embodiment, as will be described in greater detail below, the minimum signal-to-noise ratio may be selected as the threshold signal-to-noise ratio when the access point $101_1$ does not have any neighboring access points $101_1$-$101_N$ on the same channel and/or using the same SSID.

Following determination of a minimum signal-to-noise ratio, operation 307 takes the minimum value between the selected distance value and the minimum signal-to-noise ratio and assigns this value as the threshold signal-to-noise ratio for the access point $101_1$. For example, when the selected distance value from operation 303 is 6 dB and the minimum signal-to-noise ratio determined at operation 305 is 4 dB, operation 307 would determine that the selected distance value is less than the minimum signal-to-noise ratio.

Upon determining that the selected distance value is less than the minimum signal-to-noise ratio (i.e., the access points $101_1$-$101_3$ are relatively separated and are not densely packed together in the network system 100), operation 307 may assign the selected distance value, which is represented in decibels, as the threshold signal-to-noise ratio for the access point $101_1$. In particular, when the access points $101_1$-$101_3$ are not densely packed together in the network system 100, the client devices $105_1$-$105_P$ may not have many proximate access points $101_1$-$101_3$ to associate with. Accordingly, the threshold signal-to-noise ratio for the access point $101_1$ may be set to a low level that encourages association with the access point $101_1$. This will provide the client devices $105_1$-$105_P$ with greater ease in associating with access points $101_1$-$101_3$ in a low-density environment.

Conversely, upon determining that the selected distance value is greater than the minimum signal-to-noise ratio, operation 307 may assign the minimum signal-to-noise ratio as the threshold signal-to-noise ratio for the access point $101_1$. In particular, this minimum signal-to-noise ratio may be selected in situations where the particular access point $101_1$ does not have any neighboring access points 101 (i.e., access point $101_1$ is in a hotspot configuration). When the particular access point $101_1$ does not have any neighboring access points 101, an empty set value may be returned by operations 301 and 303 such that the minimum signal-to-noise ratio is chosen by operations 307 and 311 as the threshold signal-to-noise ratio.

As described above, the method 300 relies on access point $101_1$-$101_N$ density/distances in the network system 100 to determine the threshold signal-to-noise ratio for the access point $101_1$. Although described in relation to the access point $101_1$, in other embodiments the method 300 may determine a threshold signal-to-noise ratio for the access points $101_2$-$101_N$ in a similar fashion as described above. In some embodiments, the method 300 may be performed on each access point $101_1$-$101_N$ independently. In this fashion, the access points $101_1$-$101_N$ may solely and autonomously determine which client devices $105_1$-$105_P$ they associate with. In particular, upon receiving a probe request from a client device $105_1$-$105_P$ that is below a threshold signal-to-noise ratio selected by the corresponding access point $101_1$-$101_N$, the access point $101_1$-$101_N$ may ignore the request and in effect deny association with the client device $105_1$-$105_P$. Similarly, upon receiving a probe request from a client device $105_1$-$105_P$ that is at or above a threshold signal-to-noise ratio selected by the corresponding access point $101_1$-$101_N$, the access point $101_1$-$101_N$ may respond to the request and attempt to associate with the client device $105_1$-$105_P$.

Figure 4:
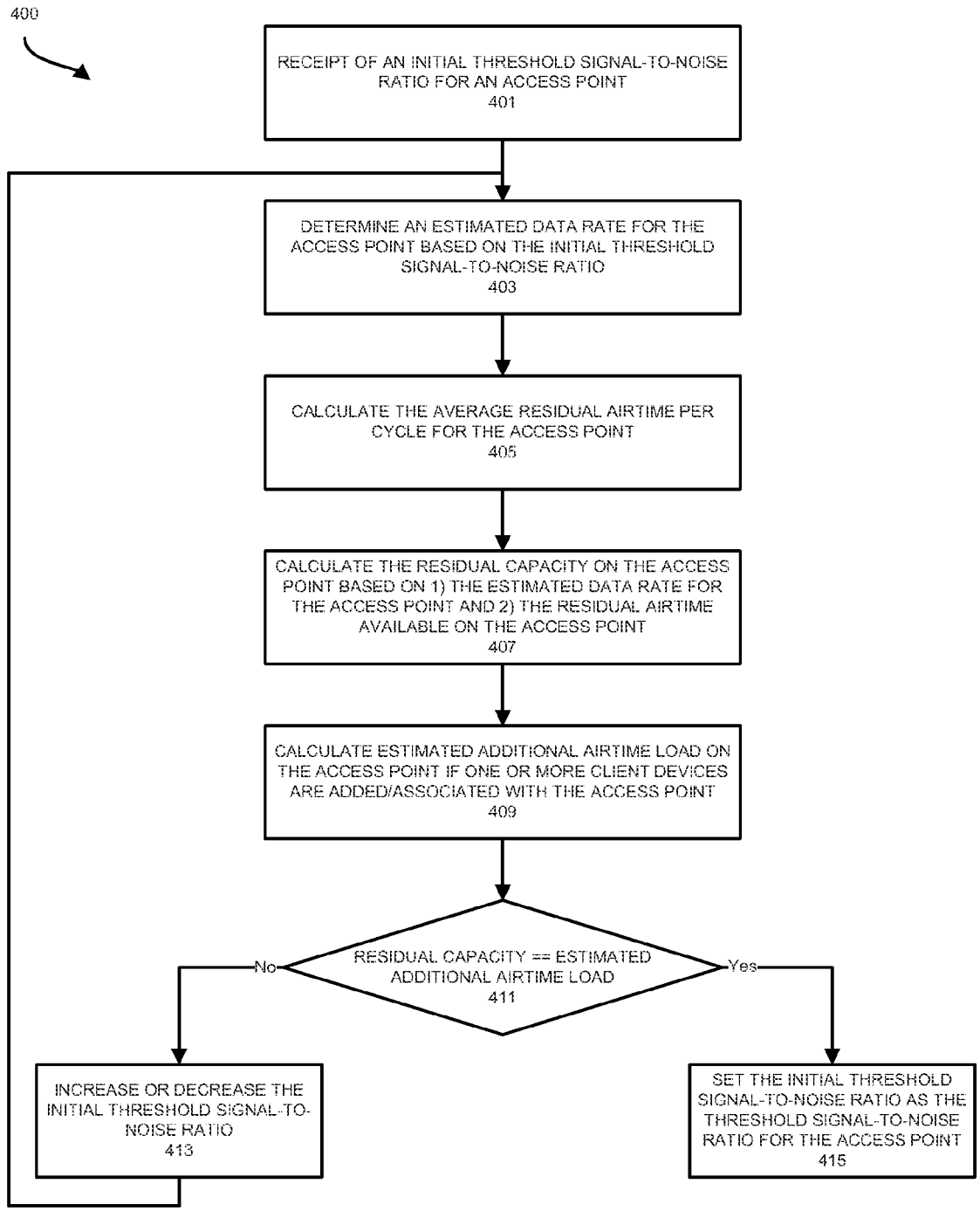
FIG. 4 shows a method for dynamically determining a threshold signal-to-noise ratio for an access point based on current and/or expected load on an access point according to one embodiment.

Turning now to FIG. 4, a method 400 for selecting a threshold signal-to-noise ratio according to another embodiment will be described. In contrast to the method 300 that determines a threshold signal-to-noise ratio based on access point $101_1$-$101_N$ density and/or distances between the access points $101_1$-$101_N$, the method 400 may determine a threshold signal-to-noise ratio based on current and/or expected client device $105_1$-$105_P$ load on an access point $101_1$-$101_N$. The method 400 may be performed by one or more devices in the network system 100. For example, the method 400 may be performed by one or more of the network controllers $103_1$-$103_M$ in conjunction with one or more of the access points $101_1$-$101_N$ in the network system 100. In one embodiment, one of the network controllers $103_1$-$103_M$ may be designated as a master network controller in the network system 100 such that each operation of the method 400 is performed by this designated master network controller. In another embodiment, the method 300 may be entirely performed by a single access point $101_1$-$101_N$. Accordingly, each access point $101_1$-$101_N$ may autonomously decide a threshold signal-to-noise ratio for responding to client device $105_1$-$105_P$ probe requests.

Although each of the operations in the method 400 are shown and described in a particular order, in other embodiments, the operations of the method 400 may be performed in a different order. For example, although the operations of the method 400 are shown as being performed sequentially, in other embodiments the operations of the method 400 may be performed in overlapping or at least partially overlapping time periods.

In some embodiments, the threshold signal-to-noise ratio determined with the method 300 for the access point $101_1$ may be used by the method 400 as an initial estimate. In this embodiment, the method 400 may refine/adjust this initial threshold signal-to-noise ratio estimate for the access point $101_1$ based on current and/or expected load on the access point $101_1$. For example, the method 400 may commence at operation 401 with receipt of an initial threshold signal-to-noise estimate for the access point $101_1$. As noted above, this initial threshold signal-to-noise estimate may be obtained through performance of the method 300.

At operation 403, this initial threshold signal-to-noise ratio estimate may be used to determine an estimated data rate for the access point $101_1$ that would achieve the initial threshold signal-to-noise ratio estimate. The estimated data rate may indicate the rate at which the access point $101_1$ would be able to communicate with the farthest client device $105_1$-$105_P$ while using the initial threshold signal-to-noise ratio estimate. For example, the initial threshold signal-to-noise ratio estimate may be used with a rate table to lookup an associated rate based on the initial threshold signal-to-noise ratio estimate. In one embodiment, a large initial threshold signal-to-noise ratio estimate would provide a corresponding large estimated data rate for the access point $101_1$ and a low initial threshold signal-to-noise ratio estimate would provide a corresponding low estimated data rate for the access point $101_1$.

In one embodiment, operation 403 may determine an estimated data rate for the access point $101_1$ also based on the average packet size transmitted and/or received by the access point $101_1$. This average packet size may be a preset value or the average packet size may be calculated over any time period (e.g., average packet size over the previous day, hour, minute, second, etc.). For example, the estimated data rate for the access point $101_1$ may be calculated at operation 403 using the following equation:

EstimatedRate=RateTable(probeReqThreshold,avgPktSize)

The rate table may be preset prior to the commencement of the method 400 and retrieved/accessed from a local or remote location. For example, the rate table may include a probe request threshold value (i.e., probeReqThreshold value), an average packet size value (i.e., avgPktSize value), and an estimated rate value (i.e., EstimatedRate value) as shown in the example table below.

| Example Rate Table | | |
|---|---|---|
| EstimatedRate | avgPktSize | probeReqThreshold |
| 450 Mbps | 500 bytes | −75 dB (RSSI) |
| 450 Mbps | 200 bytes | −80 dB (RSSI) |
| 300 Mbps | 500 bytes | −80 dB (RSSI) |
| 300 Mbps | 200 bytes | −85 dB (RSSI) |

The example rate table above indicates the minimum signal-to-noise ratio (SNR) or RSSI required for successfully transmitting a frame with an average packet size at the estimated rate. Accordingly, using a known probe request threshold value (i.e., probeReqThreshold value) and an average packet size value (i.e., avgPktSize value), an estimated rate value (i.e., EstimatedRate value) may be looked-up in the example rate table shown above.

At operation 405, the method 400 may calculate the average residual airtime per cycle for the access point $101_1$. The average residual airtime per cycle indicates the amount of airtime not currently being used by client devices 105 associated with the access point $101_1$ (e.g., client devices $105_1$-$105_3$ as shown in FIG. 1). In one embodiment, this average residual airtime per cycle may be calculated over a one second interval and may be calculated using any standard or technique, including using ASAP. In one embodiment, the average residual airtime for the access point $101_1$ that has N associated client devices 105 may be calculated at operation 405 according to the following equation:

$$ResidualAirtime = 1 - \sum_{i=1}^{N} Airtime(ClientDevice_i)$$

In one embodiment, the airtime used per client device 105 (i.e., $Airtime(ClientDevice_i)$) may be an estimated value while in other embodiments, the airtime used per client device 105 may be measured over the network system 100 during any discrete time period. In the above equation, the airtime used by each of the N client devices 105 associated with the access point $101_1$ may be summed. This summed value represents the individual fractions of a second of airtime consumed by each of the client devices 105 associated with the access point $101_1$. This value may be subtracted from a single second to arrive at the residual airtime available on the access point $101_1$ based on the N current client devices 105 associated with the access point $101_1$.

At operation 407, the residual capacity on the access point $101_1$ may be calculated based on the estimated data rate for the access point $101_1$ calculated at operation 403 and the residual airtime available on the access point $101_1$ calculated at operation 405. The residual capacity on the access point $101_1$ represents the airtime capacity on the access point $101_1$ that would be consumed if a client device 105 at the boundary of the initial threshold signal-to-noise ratio was to connect/associate with the access point $101_1$. The residual capacity on the access point $101_1$ may be calculated at operation 407 based on the below equation:

ResidualCapacity=EstimatedRate×ResidualAirtime

At operation 409 the estimated additional airtime load on the access point $101_1$ if one or more client devices 105 are added/associated with the access point $101_1$ may be calculated. For example, the access point $101_1$ may use the average load per client device 105 (i.e., the average traffic sent to and from a client device 105) to estimate the anticipated airtime load from client devices 105 that would potentially connect to the access point $101_1$. For example, the estimated additional airtime load on the access point $101_1$ may be calculated at operation 409 by the equation below:

EstimatedAdditionalLoad=(ExpectedClientNum−N)× AvgLoadPerClien

In the above equation, N indicates the number of client devices 105 presently associated with the access point $101_1$ (e.g., five client devices 105) while ExpectedClientNum is the maximum number of client devices 105 that are expected/anticipated to associate with that the access point $101_1$ in the future (e.g., thirty client devices 105). In one embodiment, the average load per client device 105 may be estimated based on the current N client devices 105 associated with the access point $101_1$, historical averages for client devices 105 associated with the access point $101_1$ at the time at which the method 400 is being performed, and/or a preconfigured setting for the access point $101_1$ and/or the network system 100. Similarly, the expected client number for the access point $101_1$ may be set based on a preset configuration value or may be estimated based on historical averages for the access point $101_1$ at the time at which the method 400 is being performed (e.g., thirty client devices 105). Since the value for the EstimatedAdditionalLoad is calculated on the basis that ExpectedClientNum≥N, when ExpectedClientNum<N the method 400 may indicate that the access point $101_1$ is already at capacity and set the signal-to-noise threshold/probe request threshold for the access point $101_1$ to a preset max setting and terminate the method 400.

At operation 411, the residual capacity on the access point $101_1$ may be compared with the estimated additional airtime load on the access point $101_1$ to determine whether the initial threshold signal-to-noise ratio efficiently uses airtime and other resources of the access point $101_1$. For example, when operation 411 determines that the residual capacity on the access point $101_1$ is greater than the estimated additional airtime load on the access point $101_1$, operation 413 may decrease the initial threshold signal-to-noise ratio for the access point $101_1$. In this case, since the residual capacity on the access point $101_1$ is greater than the estimated additional airtime load on the access point $101_1$, the access point $101_1$ has additional resources that may be used for additional client devices 105. Accordingly, decreasing the initial threshold signal-to-noise ratio may potentially allow additional client devices 105 to associate with the access point $101_1$.

Conversely, when operation 411 determines that the residual capacity on the access point $101_1$ is less than the estimated additional airtime load on the access point $101_1$, operation 413 may increase the initial threshold signal-to-noise ratio for the access point $101_1$. In this case, since the residual capacity on the access point $101_1$ is less than the estimated additional load on the access point $101_1$, the access point $101_1$ cannot support the additional client devices 105. Accordingly, increasing the initial threshold signal-to-noise ratio may potentially reduce the additional client devices 105 that are expected to associate with the access point $101_1$. Following operation 413 adjustment of the threshold signal-to-noise ratio, the method 400 may return to operation 403 to analyze this new threshold signal-to-noise ratio.

When operation 411 determines that the residual capacity on the access point $101_1$ is equal to the estimated additional load on the access point $101_1$, operation 415 may set the threshold signal-to-noise ratio for the access point $101_1$ equal to the initial threshold signal-to-noise ratio to the threshold signal-to-noise ratio for the access point $101_1$. As described above, the method 400 relies on the access point's $101_1$ current and expected load to determine the threshold signal-to-noise ratio for the access point $101_1$. In some embodiments, the method 400 may be performed on each access point $101_1$-$101_N$ independently. In this fashion, the access points $101_1$-$101_N$ may solely and autonomously determine which client devices $105_1$-$105_P$ are allowed to associate with the access point $101_1$-$101_N$. In particular, upon receiving a probe request from a client device $105_1$-$105_P$ that is below a threshold signal-to-noise ratio selected by the corresponding access point $101_1$-$101_N$, the access point $101_1$-$101_N$ may ignore the request and in effect deny association with the client device $105_1$-$105_P$. Similarly, upon receiving a probe request from a client device $105_1$-$105_P$ that is at or above a threshold signal-to-noise ratio selected by the corresponding access point $101_1$-$101_N$, the access point $101_1$-$101_N$ may respond to the request and attempt to associate with the client device $105_1$-$105_P$.

Figure 5:
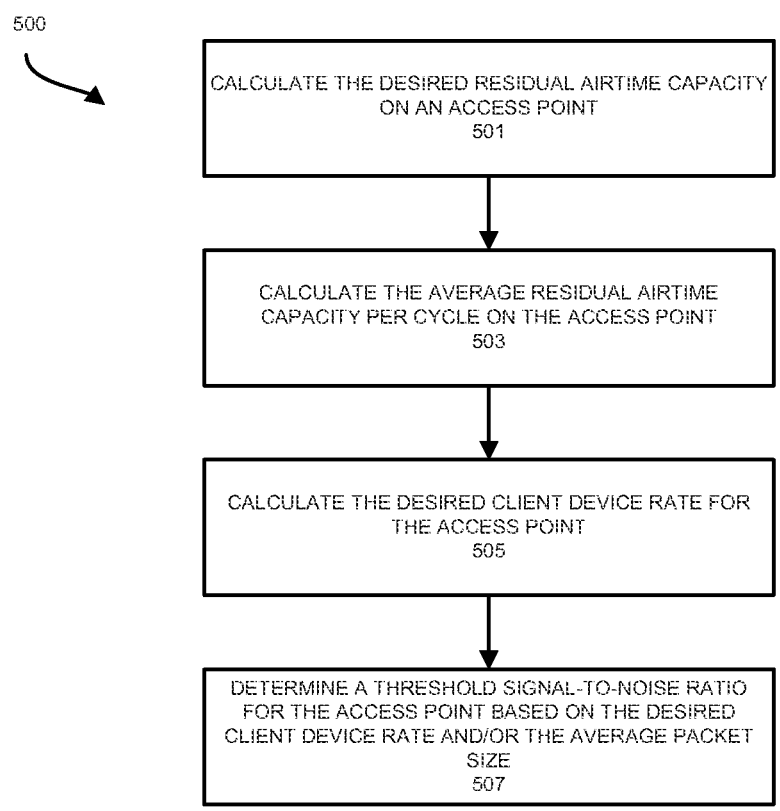
FIG. 5 shows a method for dynamically determining a threshold signal-to-noise ratio for an access point based on current and/or expected load on an access point according to another embodiment.

Although the method 400 describes determining a threshold signal-to-noise ratio for an access point $101_1$-$101_N$ based on the load generated by an initial threshold signal-to-noise ratio, in other embodiments a threshold signal-to-noise ratio may be determined without an initial value. For example, FIG. 5 shows a method 500 for determining a threshold signal-to-noise ratio for the access point $101_1$ according to another embodiment. In contrast to the method 400 that determines a threshold signal-to-noise ratio based on an initial threshold signal-to-noise ratio, the method 500 may determine a threshold signal-to-noise ratio without an initial value. However, similar to the method 400, the method 500 may determine the threshold signal-to-noise ratio for the access point $101_1$ based on current and/or expected client device $105_1$-$105_P$ load on the access point $101_1$.

The method 500 may be performed by one or more devices in the network system 100. For example, the method 500 may be performed by one or more of the network controllers $103_1$-$103_M$ in conjunction with one or more of the access points $101_1$-$101_N$ in the network system 100. In one embodiment, one of the network controllers $103_1$-$103_M$ may be designated as a master network controller in the network system 100 such that each operation of the method 500 is performed by this designated master network controller. In another embodiment, the method 500 may be entirely performed by a single access point $101_1$-$101_N$. Accordingly, each access point $101_1$-$101_N$ may autonomously decide a threshold signal-to-noise ratio for responding to client device $105_1$-$105_P$ probe requests.

Although each of the operations in the method 500 are shown and described in a particular order, in other embodiments, the operations of the method 500 may be performed in a different order. For example, although the operations of the method 500 are shown as being performed sequentially, in other embodiments the operations of the method 500 may be performed in overlapping or at least partially overlapping time periods.

In one embodiment, the method 500 may commence at operation 501 with calculation of the desired residual airtime capacity on the access point $101_1$. The desired residual airtime capacity is the airtime capacity load on the access point $101_1$ if one or more client devices 105 are added/associated with the access point $101_1$. For example, the access point $101_1$ may use the average load per client device 105 from the access point $101_1$ (i.e., the average traffic sent to and from a client device 105) to estimate the anticipated load from a client device 105 that would connect to the access point $101_1$. In one embodiment, the desired residual airtime capacity on the access point $101_1$ may be calculated at operation 501 by the equation below:

$$DesiredResidualCap=(ExpectedClientNumber-N) \times AvgLoadPerClien$$

In the above equation, N indicates the number of client devices 105 presently associated with the access point $101_1$ (e.g., five client devices 105) while ExpectedClientNum is the maximum number of client devices 105 that are expected/anticipated to associate with that the access point $101_1$ in the future (e.g., thirty client devices 105). In one embodiment, the average load per client device 105 may be estimated based on the current N client devices 105 associated with the access point $101_1$, historical averages for client devices 105 associated with the access point $101_1$ at the time at which the method 500 is being performed, and/or a preconfigured setting for the access point $101_1$ and/or the network system 100. Similarly, the expected client device 105 number for the access point $101_1$ may be set based on a preset configuration value or may be estimated based on historical averages for the access point $101_1$ at the time at which the method 500 is being performed. (e.g., thirty client devices 105). Since the value for the EstimatedAdditionalLoad is calculated on the basis that ExpectedClientNum≥N, when ExpectedClientNum<N the method 500 may indicate that the access point $101_1$ is already at capacity and set the signal-to-noise threshold/probe request threshold for the access point $101_1$ to a preset max setting and terminate the method 500

Following calculation of the desired residual airtime capacity, the average residual airtime capacity per cycle on the access point $101_1$ may be calculated at operation 503. The average residual airtime per cycle indicates the amount of airtime not currently being used by the N client devices 105 currently associated with the access point $101_1$. In one embodiment, this average residual airtime per cycle may be calculated over a one second interval and may be calculated using any standard or technique, including using ASAP. In one embodiment, the average residual airtime for the access point $101_1$ that has N associated client devices 105 may be calculated according to the following equation:

$$ResidualAirtime = 1 - \sum_{i=1}^{N} Airtime(ClientDevice_i)$$

In the above equation, the airtime used by each of the N client devices 105 associated with the access point $101_1$ may be summed. This summed value represents the individual fractions of seconds of airtime consumed by each of the client devices 105 associated with the access point $101_1$. This value may be subtracted from a single second to arrive at the residual airtime available on the access point $101_1$ based on the N current client devices 105 associated with the access point $101_1$.

At operation 505, the desired client device 105 rate for the access point $101_1$ may be calculated. The desired client device 105 rate may represent the data rate for each of the client devices 105 if additional client devices 105 are associated with the access point $101_1$. In one embodiment, the desired client device 105 rate may be determined based on the desired residual airtime capacity on the access point $101_1$ calculated at operation 501 and the average residual airtime capacity per cycle on the access point $101_1$ calculated at operation 503. For example, the desired client device 105 rate may be calculated at operation 505 based on the following equation:

$$DesiredClientRate = \frac{DesiredResidualCap}{ResidualAirtime}$$

Utilizing the desired client device 105 rate, operation 507 may determine a threshold signal-to-noise ratio for the access point $101_1$. In one embodiment, the desired client device 105 rate may be used with a rate table to determine the threshold signal-to-noise ratio. For example, operation 507 may look up the threshold signal-to-noise ratio corresponding to the desired client device 105 rate in the rate table. In one embodiment, this lookup may be performed along with the average packet size transmitted and/or received by the access point $101_1$. This average packet size may be calculated over any time period (e.g., average packet size over previous day, hour, minute, second, etc.). For example, the threshold signal-to-noise ratio for the access point $101_1$ may be calculated at operation 507 using the following equation:

ThresholdSNR=RateTable(DesiredClientRate,avgPktSize)

The rate table may be preset prior to the commencement of the method 500 and retrieved/accessed from a local or remote location.

As described above, the threshold signal-to-noise ratio may be determined such that airtime capacity for the access point $101_1$ is efficiently utilized. As described above, the method 500 relies on the access point's $101_1$ current and expected load to determine the threshold signal-to-noise ratio for the access point $101_1$. In contrast to the method 400, the method 500 does not rely on or require an initial estimate for the threshold signal-to-noise ratio.

In some embodiments, the method 500 may be performed on each access point $101_1$-$101_N$ independently. In this fashion, the access points $101_1$-$101_N$ may solely and autonomously determine which client devices $105_1$-$105_P$ are allowed to associate with the access point $101_1$-$101_N$. In particular, upon receiving a probe request from a client device $105_1$-$105_P$ that is below a threshold signal-to-noise ratio selected by the corresponding access point $101_1$-$101_N$, the access point $101_1$-$101_N$ may ignore the request and in effect deny association with the client device $105_1$-$105_P$. Similarly, upon receiving a probe request from a client device $105_1$-$105_P$ that is at or above a threshold signal-to-noise ratio selected by the corresponding access point $101_1$-$101_N$, the access point $101_1$-$101_N$ may respond to the request and attempt to associate with the client device $105_1$-$105_P$.

As described above, system and methods are provided for dynamically setting a threshold signal-to-noise ratio for probe requests for one or more access points $101_1$-$101_N$ in a wireless network 100 based on several factors, including density/distance between access points $101_1$-$101_N$ and/or current and expected load on access points $101_1$-$101_N$. By dynamically adjusting a threshold signal-to-noise for probe requests, the systems and methods described herein may efficiently utilize resources based on current and/or expected conditions. In one embodiment, one or more of the methods 300, 400, and 500 may be performed periodically to ensure that corresponding threshold signal-to-noise ratios for probe requests are optimally set. For example, the methods 300, 400, and/or 500 may be performed during setup of the network system 100, at scheduled intervals (e.g., every ten minutes), and/or upon an access point $101_1$-$101_N$ and/or client device $105_1$-$105_P$ joining the network system 100.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations to:
    obtain information associated with a particular access point, the information comprising an average packet size of packets exchanged with the particular access point;
    based at least on the obtained information, compute a signal strength threshold value to be used by the particular access point for determining whether or not to respond to any probe request received from a wireless device;

receive, from the wireless device by the particular access point, a first probe request in a wireless signal with a first signal strength;
responsive at least to determining that the first signal strength is above the signal strength threshold value, respond, by the particular access point, to the first probe request; and
responsive at least to determining that the first signal strength is below the signal strength threshold value, refrain from responding, by the particular access point, to the first probe request.

2. The medium of claim 1, wherein the determining that the first signal strength is above or below the signal strength threshold value is performed at Open Systems Interconnection (OSI) Layer 2.

3. The medium of claim 1, wherein the instructions to compute, when executed, are to:
determine an estimated data rate for the particular access point, based on the average packet size, an initial signal strength threshold value, and information relating respective pairs of packet size values and signal strength threshold values to respective estimated data rate values.

4. The medium of claim 3, further comprising instructions to:
select a set of access points that each use at least one of a same service set identifier (SSID) as the particular access point and a same channel as the particular access point.

5. The medium of claim 4, further comprising instructions to:
determine a distance from at least one of the set of access points to the particular access point.

6. The medium of claim 5, further comprising instructions to:
determine the initial signal strength threshold value based on the determined distance.

7. The medium of claim 3, wherein the instructions to compute, when executed, are to:
calculate an average residual airtime per cycle for the particular access point, indicating an estimated or actual amount of airtime not currently being used by client devices associated with the particular access point; and
calculate a residual capacity on the particular access point, based on the estimated data rate for the particular access point and the calculated average residual airtime per cycle for the particular access point.

8. The medium of claim 7, wherein the instructions to compute, when executed, are to:
calculate an estimated additional airtime load on the particular access point when at least one additional client device is associated with the particular access point.

9. The medium of claim 8, wherein the instructions to compute, when executed, are to:
compare the residual capacity for the particular access point to the estimated additional airtime load on the particular access point;
in response to a determination that the residual capacity for the particular access point is greater than the estimated additional airtime load on the particular access point, compute the signal strength threshold value by decreasing the initial signal strength threshold value; and
in response to a determination that the residual capacity for the particular access point is less than the estimated additional airtime load on the particular access point, compute the signal strength threshold value by increasing the initial signal strength threshold value.

10. The medium of claim 9, wherein the instructions to compute, when executed, are to:
in response to a determination that the residual capacity for the particular access point is equal to the estimated additional airtime load on the particular access point, set the signal strength threshold value for the particular access point to be equal to the initial signal strength threshold value.

11. A system comprising:
a particular access point;
wherein the system is to perform operations comprising operations to:
obtain information associated with a particular access point, the obtained information comprising information relating a packet size value and a signal strength threshold value to an estimated data rate value;
based at least on the obtained information, compute a signal strength threshold value to be used by the particular access point for determining whether or not to respond to any probe request received from a wireless device;
receive, from the wireless device by the particular access point, a first probe request in a wireless signal with a first signal strength;
responsive at least to determining that the first signal strength is above the signal strength threshold value, respond, by the particular access point, to the first probe request;
responsive at least to determining that the first signal strength is below the signal strength threshold value, refrain from responding, by the particular access point, to the first probe request.

12. The system of claim 11, to perform operations comprising operations to:
determine the estimated data rate value of the obtained information to be an estimated data rate for the particular access point, based on the obtained information, an average packet size of packets exchanged with the particular access point, and an initial signal strength threshold value.

13. The system of claim 12, to perform operations further comprising operations to:
select a set of access points that each use at least one of a same service set identifier (SSID) as the particular access point and a same channel as the particular access point.

14. The system of claim 13, to perform operations further comprising operations to:
determine at least one distance from at least one of the first set of access points to the particular access point.

15. The system of claim 14, to perform operations comprising operations to:
determine the initial signal strength threshold value based on the determined distance.

16. The medium of claim 12, wherein the instructions to compute, when executed, are to:
calculate an average residual airtime per cycle for the particular access point, indicating an estimated or actual amount of airtime not currently being used by client devices associated with the particular access point;
calculate a residual capacity on the particular access point, based on the estimated data rate for the particular access point and the calculated average residual airtime per cycle for the particular access point; and
calculate an estimated additional airtime load on the particular access point when at least one additional client device is associated with the particular access point.

17. The medium of claim 16, wherein the instructions to compute, when executed, are to:
- compare the residual capacity for the particular access point to the estimated additional airtime load on the particular access point;
- in response to a determination that the residual capacity for the particular access point is greater than the estimated additional airtime load on the particular access point, compute the signal strength threshold value by decreasing the initial signal strength threshold value; and
- in response to a determination that the residual capacity for the particular access point is less than the estimated additional airtime load on the particular access point, compute the signal strength threshold value by increasing the initial signal strength threshold value.

18. A method comprising:
- obtaining information associated with a particular access point, the information comprising an average packet size of packets exchanged with the particular access point;
- based at least on the obtained information, computing a signal strength threshold value to be used by a particular access point for determining whether or not to respond to any probe request received from a wireless device; and
- setting the computed signal strength threshold value as the signal strength threshold value to be used by the particular access point for determining whether or not to respond to any probe request received from a wireless device.

19. The method of claim 18, wherein the obtaining, the computing, and the setting are performed by a network controller.

20. The method of claim 18, wherein the obtaining, the computing, and the setting are performed by the particular access point.

* * * * *